US009366080B2

(12) United States Patent
Colson

(10) Patent No.: US 9,366,080 B2
(45) Date of Patent: Jun. 14, 2016

(54) SLATTED ROLLER BLIND

(75) Inventor: Wendell B. Colson, Weston, MA (US)

(73) Assignee: HUNTER DOUGLAS INC., Pearl River, NY (US)

( * ) Notice: Subject to any disclaimer, the term of this patent is extended or adjusted under 35 U.S.C. 154(b) by 512 days.

(21) Appl. No.: 13/129,808

(22) PCT Filed: Nov. 17, 2009

(86) PCT No.: PCT/US2009/064682
§ 371 (c)(1),
(2), (4) Date: May 17, 2011

(87) PCT Pub. No.: WO2010/059581
PCT Pub. Date: May 27, 2010

(65) Prior Publication Data
US 2011/0220303 A1 Sep. 15, 2011

Related U.S. Application Data

(60) Provisional application No. 61/199,551, filed on Nov. 18, 2008.

(51) Int. Cl.
E06B 9/08 (2006.01)
E06B 9/34 (2006.01)
E06B 9/386 (2006.01)

(52) U.S. Cl.
CPC .. *E06B 9/34* (2013.01); *E06B 9/386* (2013.01)

(58) Field of Classification Search
CPC ......... E06B 9/264; E06B 9/262; E06B 9/386; E06B 9/322; E06B 9/40; E06B 9/34
USPC .............. 160/108, 113, 114, 120, 122, 121.1, 160/123, 127, 133, 237, 238, 262, 264, 87, 160/89, 179, 84.04, 352
See application file for complete search history.

(56) References Cited

U.S. PATENT DOCUMENTS 1,962,868 A 6/1934 Gregg
2,012,887 A * 8/1935 Major ........................... 160/133
(Continued)

FOREIGN PATENT DOCUMENTS

CN 1110483 A 10/1995
CN 1549884 A 11/2004
(Continued)

OTHER PUBLICATIONS

Machine Translation of DE3912528, accessed from www.epo.org.*
International Search Report, Jun. 24, 2011, International Searching Authority.
Written Opinion of the International Searching Authority, Jun. 24, 2011, International Searching Authority.
International Search Report in related International Application PCT/US2011/039473, Oct. 5, 2011.
Written Opinion in related International Application PCT/US2011/039473, Oct. 5, 2011.
(Continued)

*Primary Examiner* — Syed A Islam
*Assistant Examiner* — Jeremy Ramsey
(74) *Attorney, Agent, or Firm* — Day Pitney LLP

(57) ABSTRACT

A roller blind is disclosed which provides horizontal slats for directional shading, enabling the application of a screen fabric which allows a greater portion of visible light to pass therethrough. The disclosed slatted roller blind is free from the usage of ladder cords and is simplistic in design. The disclosed slatted roller blind maintains a compact formation of a roller shade when retracted and has greater resistance to skewing along the longitudinal axis of the roller while being retracted. Furthermore, the disclosed slatted roller blind design is capable of being utilized as an outdoor or indoor blind.

37 Claims, 5 Drawing Sheets

(56) References Cited

U.S. PATENT DOCUMENTS

| | | | |
|---|---|---|---|
| 2,024,090 A * | 12/1935 | Cadmus | 160/180 |
| 2,200,605 A | 5/1940 | Pierce | |
| 2,231,778 A * | 2/1941 | Swanson | 160/170 |
| 2,267,869 A * | 12/1941 | Loehr | 160/89 |
| 3,467,037 A | 9/1969 | Frydryk | |
| 3,990,201 A | 11/1976 | Falbel | |
| 4,039,019 A | 8/1977 | Hopper | |
| 4,066,062 A | 1/1978 | Houston | |
| 4,078,323 A | 3/1978 | Baumgarten | |
| 4,194,550 A | 3/1980 | Hopper | |
| 4,338,996 A | 7/1982 | Frank | |
| 4,359,079 A | 11/1982 | Bledsoe | |
| 4,382,436 A | 5/1983 | Hager | |
| 4,532,917 A | 8/1985 | Taff et al. | |
| 4,535,828 A | 8/1985 | Brockhaus | |
| 4,550,758 A | 11/1985 | Johnson et al. | |
| 4,649,980 A | 3/1987 | Kunz | |
| 4,692,744 A | 9/1987 | Hickman | |
| 4,722,382 A | 2/1988 | Vecchiarelli | |
| 4,763,890 A | 8/1988 | Zimmerman et al. | |
| 5,129,440 A | 7/1992 | Colson | |
| 5,217,000 A | 6/1993 | Pierce-Bjorklund | |
| 5,325,579 A | 7/1994 | Baier | |
| D352,856 S | 11/1994 | Ford | |
| 5,419,385 A | 5/1995 | Vogel et al. | |
| 5,503,210 A | 4/1996 | Colson | |
| 5,547,006 A | 8/1996 | Auger | |
| 5,566,738 A | 10/1996 | Yadidya | |
| 5,600,974 A | 2/1997 | Schnegg et al. | |
| 5,603,368 A | 2/1997 | Colson et al. | |
| 5,638,881 A | 6/1997 | Ruggles et al. | |
| 5,787,951 A | 8/1998 | Tonomura et al. | |
| 5,897,731 A | 4/1999 | Colson | |
| 6,006,812 A | 12/1999 | Corey | |
| 6,057,029 A | 5/2000 | Demestre et al. | |
| 6,094,290 A | 7/2000 | Crawford et al. | |
| D439,785 S | 4/2001 | Throne | |
| D440,102 S | 4/2001 | Colson et al. | |
| D444,658 S | 7/2001 | Swiszcz et al. | |
| 6,257,302 B1 | 7/2001 | Bednarczyk et al. | |
| D446,416 S | 8/2001 | Throne | |
| 6,302,982 B1 | 10/2001 | Corey et al. | |
| 6,354,353 B1 | 3/2002 | Green et al. | |
| 6,374,896 B1 | 4/2002 | Moeller | |
| D459,933 S | 7/2002 | Goodman | |
| 6,470,950 B2 * | 10/2002 | Shimizu | 160/121.1 |
| 6,484,390 B1 | 11/2002 | Gouldson et al. | |
| 6,613,404 B2 | 9/2003 | Johnson | |
| 6,688,369 B2 | 2/2004 | Colson et al. | |
| 6,745,811 B1 | 6/2004 | Nien | |
| 6,758,211 B1 | 7/2004 | Schmidt | |
| D496,204 S | 9/2004 | Tuzmen | |
| 6,792,994 B2 * | 9/2004 | Lin | 160/84.03 |
| D498,105 S | 11/2004 | Tyner | |
| D503,578 S | 4/2005 | Boehm | |
| 7,058,292 B2 | 6/2006 | Hirano | |
| 7,063,122 B2 | 6/2006 | Colson et al. | |
| 7,100,666 B2 | 9/2006 | Colson et al. | |
| 7,111,659 B2 | 9/2006 | Harper et al. | |
| 7,191,816 B2 | 3/2007 | Colson et al. | |
| 7,409,980 B1 * | 8/2008 | Heissenberg | 160/133 |
| 7,418,313 B2 | 8/2008 | Devis et al. | |
| 7,513,292 B2 | 4/2009 | Auger et al. | |
| 7,588,068 B2 | 9/2009 | Colson et al. | |
| 7,708,047 B2 | 5/2010 | Auger | |
| D632,493 S | 2/2011 | Colson et al. | |
| D636,204 S | 4/2011 | Elinson et al. | |
| D640,472 S | 6/2011 | Colson et al. | |
| 8,020,602 B2 | 9/2011 | Smith et al. | |
| D646,516 S | 10/2011 | Ehrsam | |
| D657,176 S | 4/2012 | Stern | |
| 8,171,640 B2 | 5/2012 | Colson et al. | |
| D668,090 S | 10/2012 | Colson et al. | |
| D671,349 S | 11/2012 | Judkins | |
| D686,433 S | 7/2013 | Marocco | |
| 8,496,768 B2 | 7/2013 | Holt et al. | |
| D691,397 S | 10/2013 | Colson et al. | |
| D692,684 S | 11/2013 | Colson et al. | |
| D693,600 S | 11/2013 | Jelic et al. | |
| 8,639,387 B2 | 1/2014 | Byberg et al. | |
| 8,763,673 B2 | 7/2014 | Jelic et al. | |
| 2004/0065416 A1 | 4/2004 | Auger et al. | |
| 2005/0205217 A1 * | 9/2005 | Harper et al. | 160/89 |
| 2006/0179991 A1 | 8/2006 | Nien et al. | |
| 2006/0191646 A1 | 8/2006 | Harper et al. | |
| 2006/0207730 A1 | 9/2006 | Berman et al. | |
| 2007/0074826 A1 | 4/2007 | Jelic et al. | |
| 2007/0088104 A1 | 4/2007 | Hung et al. | |
| 2008/0014446 A1 | 1/2008 | Donea et al. | |
| 2008/0066277 A1 | 3/2008 | Colson et al. | |
| 2008/0264572 A1 | 10/2008 | Randle | |
| 2008/0303686 A1 | 12/2008 | Mosbrucker | |
| 2009/0205789 A1 | 8/2009 | Watkins et al. | |
| 2009/0321024 A1 | 12/2009 | Harper et al. | |
| 2010/0126675 A1 | 5/2010 | Jelic et al. | |
| 2010/0186903 A1 | 7/2010 | Liang et al. | |
| 2010/0266801 A1 | 10/2010 | Jahoda et al. | |
| 2010/0276088 A1 | 11/2010 | Jelic et al. | |
| 2010/0276089 A1 | 11/2010 | Jelic et al. | |
| 2011/0088324 A1 | 4/2011 | Wessel | |
| 2011/0088852 A1 | 4/2011 | Hu et al. | |
| 2011/0133940 A1 | 6/2011 | Margalit | |
| 2011/0146922 A1 | 6/2011 | Colson et al. | |
| 2011/0170170 A1 | 7/2011 | Boote | |
| 2011/0220303 A1 | 9/2011 | Colson | |
| 2012/0038841 A1 | 2/2012 | Taheri et al. | |
| 2012/0118514 A1 | 5/2012 | Hughes | |
| 2012/0222722 A1 | 9/2012 | Baruchi | |
| 2012/0241104 A1 | 9/2012 | Huffer et al. | |
| 2012/0318475 A1 | 12/2012 | Glover | |
| 2013/0038093 A1 | 2/2013 | Snider | |
| 2013/0098565 A1 | 4/2013 | Colson et al. | |
| 2013/0105094 A1 | 5/2013 | Colson et al. | |
| 2013/0128336 A1 | 5/2013 | Dean et al. | |
| 2013/0180676 A1 | 7/2013 | Berman et al. | |
| 2013/0240158 A1 | 9/2013 | Chen | |
| 2014/0034251 A1 | 2/2014 | Colson et al. | |
| 2014/0053989 A1 | 2/2014 | Li et al. | |
| 2015/0041072 A1 | 2/2015 | Hsu et al. | |

FOREIGN PATENT DOCUMENTS

| | | | |
|---|---|---|---|
| CN | 2703855 Y | | 6/2005 |
| CN | 201194726 Y | | 2/2009 |
| CN | 101984889 A | | 3/2011 |
| CN | 102007262 A | | 4/2011 |
| DE | 70451 C | | 1/1893 |
| DE | 2709207 A1 | | 9/1978 |
| DE | 3912528 A | * | 10/1990 |
| EP | 0511956 A1 | | 11/1992 |
| EP | 0818601 A1 | | 1/1998 |
| EP | 2113626 A2 | | 11/2009 |
| GB | 1494842 A | | 12/1977 |
| WO | 9704207 A1 | | 2/1997 |
| WO | 0206619 A1 | | 1/2002 |
| WO | 0241740 A1 | | 5/2002 |
| WO | 03/008751 A1 | | 1/2003 |
| WO | 2005098190 A1 | | 10/2005 |
| WO | 2009/103045 A2 | | 8/2009 |
| WO | 2010059581 A2 | | 5/2010 |
| WO | 2011130593 A2 | | 10/2011 |
| WO | 2012142519 A1 | | 10/2012 |
| WO | 2012142522 A1 | | 10/2012 |

OTHER PUBLICATIONS

First Office Action in related Chinese patent application No. CN 2009-80145982.0, issued Sep. 2, 2013. (Text provided in Chinese and English languages.).

USPTO Non-Final Office Action in related U.S. Appl. No. 13/707,856, Jul. 30, 2014.

USPTO Non-Final Office Action in related U.S. Appl. No. 13/707,856, Mar. 24, 2015.

* cited by examiner

SLATTED ROLLER BLIND

CONTINUITY

This application is a U.S. National Stage of International Application No. PCT/US2009/064682, filed on Nov. 17, 2009, and claims priority to U.S. Provisional Patent Application No. 61/199,551, filed on Nov. 18, 2008, the disclosure of each of which is incorporated herein by reference in its entirety.

BACKGROUND OF THE INVENTION

1. Field of the Invention

The present invention relates to a roller blind for architectural openings, such as doors and windows. More specifically, the present invention relates to roller blinds with slats for providing directional shading.

2. Description of the Related Art

Various systems are known for controlling the amount of light that may pass through an architectural opening, such as a door or a window. Such systems are frequently used as aesthetic and/or functional door or window coverings.

One such system is a roller shade or blind. Roller blinds are manufactured from, for example, a woven fabric. Such blinds have a common aesthetic design, are typically lightweight and have a minimal amount of moving parts. The fabric winds compactly about a center roller when retracted, making the system easy to manipulate, e.g., carry and install.

Roller blinds have known problems. For example, traditional roller blinds, e.g., those having vinyl screens, tend to skew or shift along the longitudinal axis of the roller while the blind is being retracted. Once skewed, the roller could not be further retracted until the blind was extended and the shifted portion was properly realigned.

Another problem with typical blinds having vinyl screens is that the screens essentially block all light from passing into a space. As such, the space is either bathed in sunlight or very dark.

More recently, screens for roller blinds have been fabricated from a dense fiberglass core with a vinyl PVC coating. Such a screen, known as a fiberglass roll screen, often includes a plurality of spaced apart apertures which allow ambient light to pass into a room. The apertures, and therefore the blinds, are incapable of providing a directional shading of light. Rather, direct light passes through from all directions. Accordingly, the fabric must be sufficiently opaque to limit the passage of light, and in particular, direct sunlight. Screen fabric of this type typically has an open area of three to five percent of the total area of the screen.

On the other hand, horizontal slatted blind systems allow directional shading of light. However, such systems are less desirable to those seeking the simplicity, benefits and style of a roller type blind. For example, slatted systems require additional structure for rotating the slats to obtain the desired light directing characteristics. Slatted systems also require vertical ladder cords to maintain the slats in proper vertical, horizontal and angular orientation. To avoid the use of an abundance of ladder chords, slats need to be manufactured from rigid material, such as metal, wood, or rigid plastic, which adds significant weight.

An example of a typically complex slatted blind is disclosed in U.S. Pat. No. 4,722,382 to Vecchiarelli. This publication discloses utilizing a plurality of lift cords, which pass through holes in each slat and are secured to a bottom rail member. The lift cords may be pulled to raise or lower the slats relative to a headrail. The complexity of this system increases its cost as a whole and increases the likelihood that it will malfunction.

Yet other publications teach horizontally slatted blinds which are capable of being retracted in a rolled-up form. Two such publications include U.S. Pat. No. 2,012,887 to Major, granted on Aug. 27, 1935, and German Patent (Patentschrift) No. 70,451, granted in 1893.

The '887 publication discloses vertically extending strips and attachment members connecting slats to the strips. As illustrated in FIG. 2 of the publication, incorporated herein by reference, the slats have a radius of curvature which is greater than the radius of curvature for the roller. As such, the edges of the slats extend tangentially beyond the roller while the blind is retracted. Such a system is incapable of forming the compact configuration about the roller when the blind is retracted. Instead, the retracted blind forms a configuration which is bulky and difficult to manipulate.

The '451 publication discloses the opposite problem illustrated in the '887 publication. As illustrated in FIG. 3 of the '451 publication, incorporated herein by reference, the slats are formed with a constant curvature radius, which appears to be the curvature of the roller. Most slats will flex away from the roller as the blind is retracted. This is because the radius of the retracted blind increases as the blind is retracted. The end result, however, is the same as with the '887 publication. The retracted blind forms a configuration which is bulky and difficult to manipulate.

Another type of blind is disclosed in prior art Patent Specification Number GB 1,494,842, filed on Apr. 23, 1975 by Margaret L. Steel, incorporated herein by reference. The '842 publication illustrates in FIG. 9 and discloses at page 3, starting at line 63, a "temperature sensitive blind". The blind has slats that are formed by bonding two plastics with different thermal expansion coefficients, so that the curvature of the slats changes as a function of temperature. For example, as the temperature rises, the slats flatten out. On the other hand, as the temperature lowers, the curvature of the slats increases.

Depending on the temperature, such temperature sensitive slats would exhibit problems associated with both the '887 and '451 publications. As the temperature decreases the curvature of the slats, the slats will extend tangentially beyond the roller while the blind is retracted. As the temperature increases the curvature of the slats, most slats will flex away from the roller as the blind is retracted. In either circumstance, the retracted blind forms a configuration which is bulky and difficult to manipulate.

In addition to the above stated issues in the art, another disadvantage of known blind systems is that they are generally designed to cover architectural openings on the inside of a building. Directional shading blinds have not been introduced which can be readily positioned in the interior or exterior due to the complexity of the design, resulting in a potential for failure in an exterior environment. The present invention fulfills this need.

SUMMARY OF THE EMBODIMENTS

In light of this brief description of the disadvantages of prior-art blind systems, a roller blind is disclosed which provides horizontal slats for directional shading, enabling the application of a screen fabric which allows a greater portion of visible light to pass therethrough. The disclosed slatted roller blind is free from the usage of ladder cords and is simplistic in design. The disclosed slatted roller blind maintains a compact formation of a roller shade when retracted and has greater resistance to skewing along the longitudinal axis of the roller while being retracted. Furthermore, the disclosed slatted roller blind design is capable of being utilized as an outdoor or indoor blind.

Other aspects of the embodiments of the invention will become apparent from the drawings and respective descriptions that follow.

BRIEF DESCRIPTION OF THE DRAWINGS

It is to be understood that the following drawings depict details of only typical embodiments of the invention and are not therefore to be considered to be limiting of its scope, and in particular.

DETAILED DESCRIPTION OF THE DISCLOSED EMBODIMENTS

Figure 1:
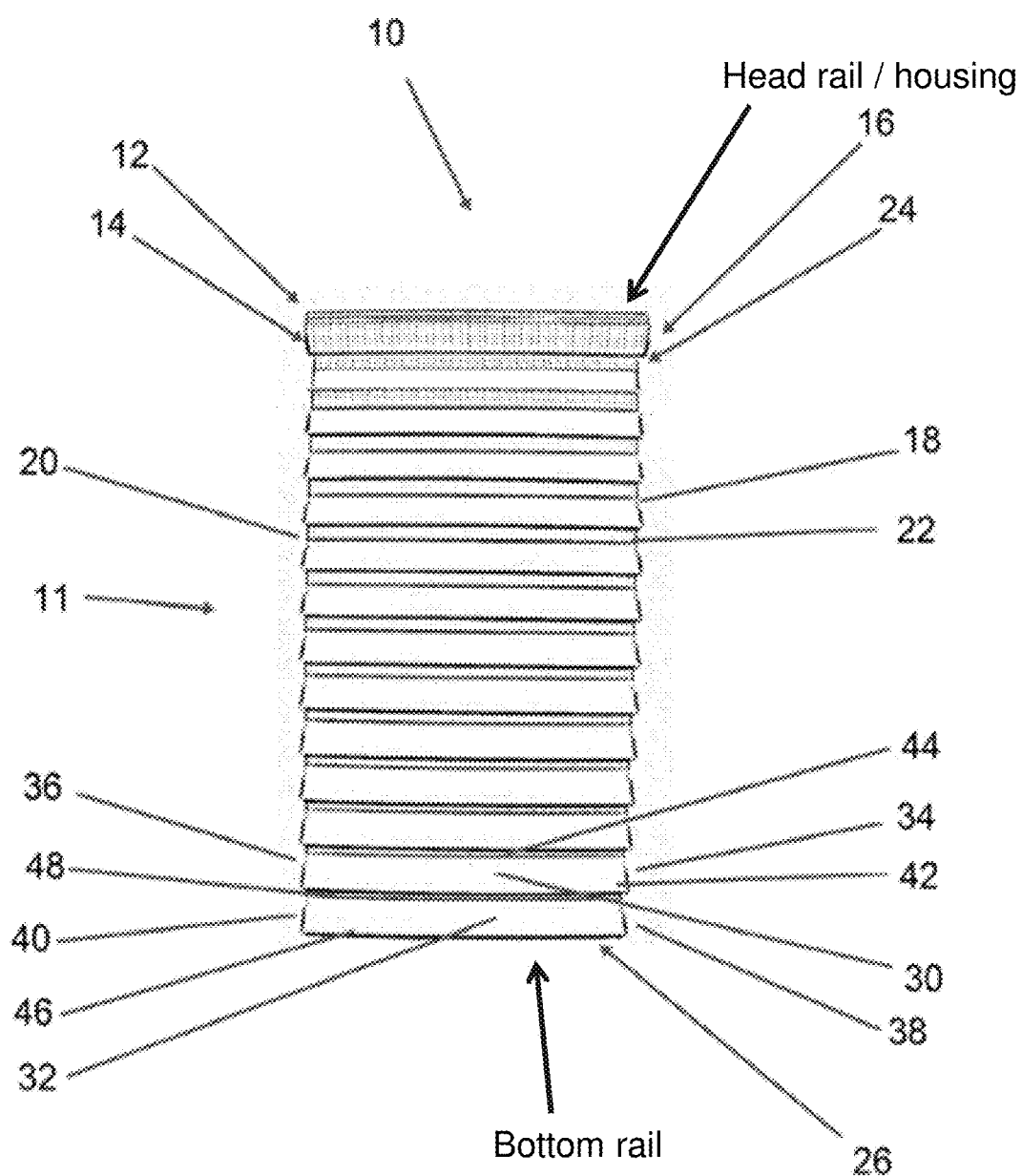
FIG. 1 illustrates the sun facing side of a slatted roller blind, according to an embodiment of the invention.

Turning to FIG. 1, a slatted roller blind 10 is illustrated, according to an embodiment of the invention. The slatted roller blind includes plural slats or louvers 11, discussed in detail, below. The slats 11 distinguish the slatted roller blind 10 from a traditional roller blind because, for reasons discussed below, the slats 11 provide the blind with directional shading.

The slatted roller blind 10 includes a roller 12. The axial length of the roller 12, defined between opposing side edges 14, 16 of the roller 12, spans the width of the blind 10. The roller 12 is designed to support the blind 10 without additional ladder cords. The illustrated roller 12 is about twenty inches long, but a full range of lengths are anticipated for covering architectural openings of various sizes.

The slatted roller blind includes a screen 18. The width of the screen, defined by opposing side edges 20, 22, is substantially the same as the width of the roller 12. The length of the screen 18, which is the length of the blind 10, is defined by opposing top and bottom screen edges 24, 26. The top edge 24 is connected directly to the roller 12 and the bottom edge 26 is distanced therefrom. The screen length can be a typically available length for off-the-shelf roller blinds or can be a tailored length as specified for upscale window or door treatments.

The plural slats 11 include, e.g., first and second vertically spaced slats 30, 32 Each of the slats has substantially the same length, defined by opposing side edges 34, 36 in first slat 30, and opposing side edges 38, 40 in the second slat 32. Furthermore, the length of the slats is substantially the same as the length of the roller 12.

Each of the slats 30, 32 also has substantially the same circumferential dimension, defined by opposing front and back edges 42, 44 in the first slat 30, and opposing front and back edges 46, 48 in the second slat 32. The depth of each slat 40, 42 is proportional to Pi, which is effectively about a third of the circumference of the outer diameter of the roller 12. Deeper slats will provide the blind with poor retracting and extending characteristics. Other problems associated with a deeper slat is the propensity to trap water in an exterior placement. On the other hand, slats shallower than about a third of the circumference will have less slat material to direct and/or block light and thus function less effectively and have an adverse effect on directional shading.

Figure 2:
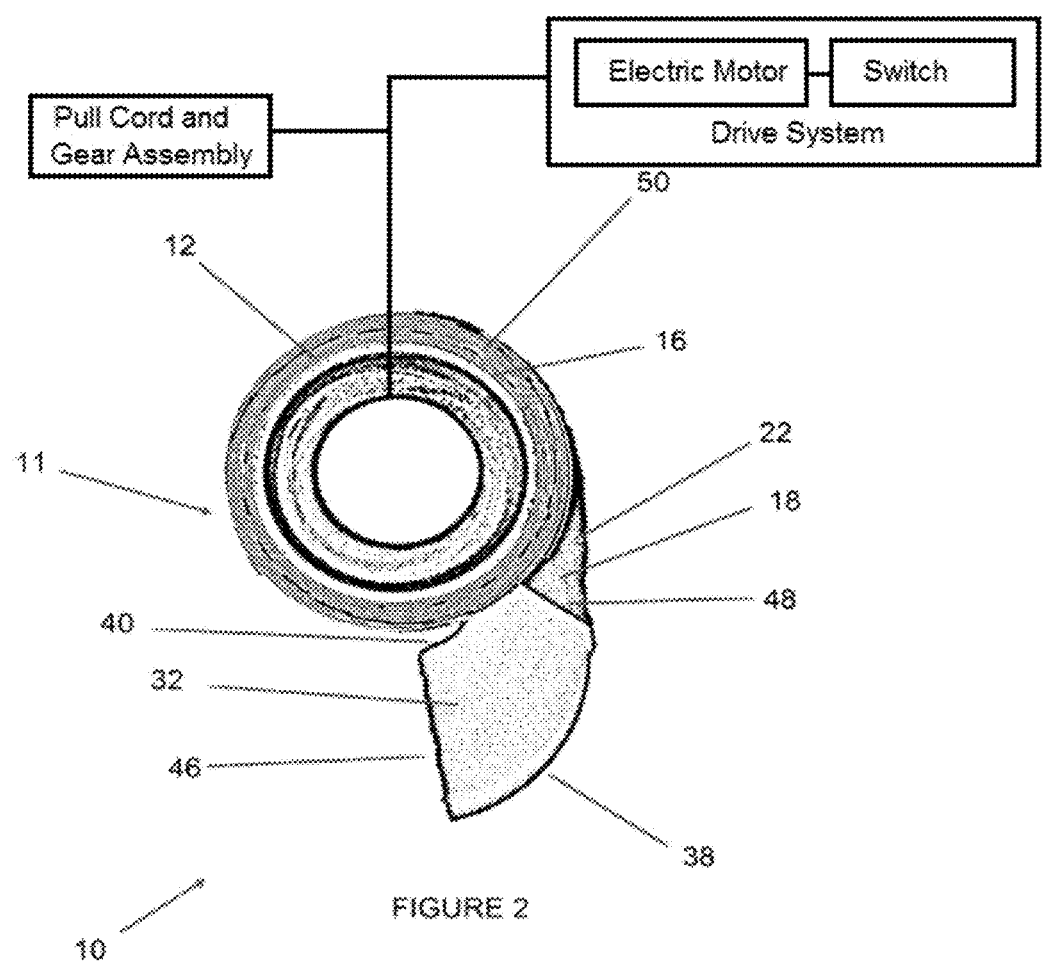
FIG. 2 illustrates a side view of the blind illustrated in FIG. 1.
Figure 3:
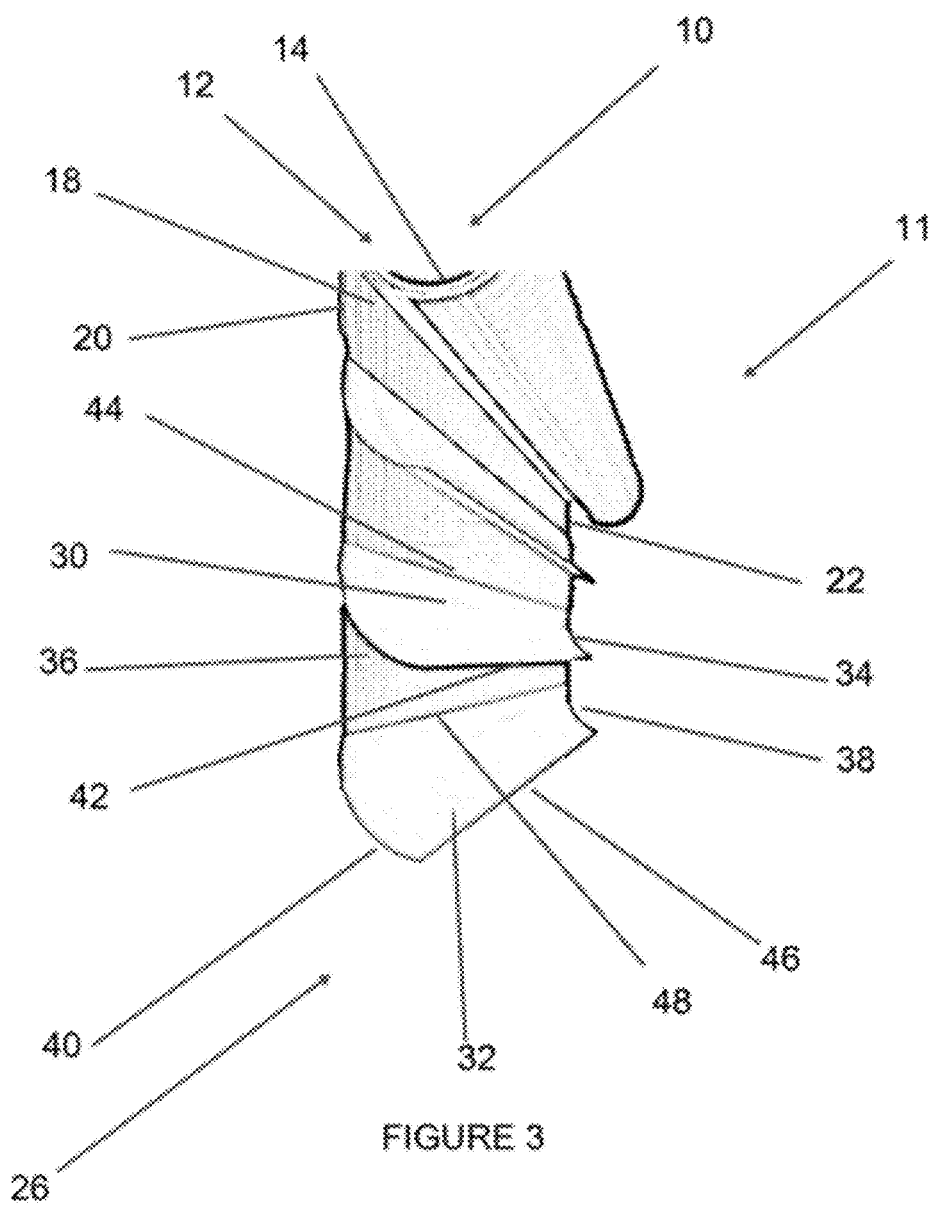
FIG. 3 illustrates a perspective view of the blind illustrated in FIG. 1.

FIGS. 2 and 3 will now be referenced to illustrate the edge curvature of the slats 11. As illustrated in FIG. 2, when retracted, the blind 10, with the screen 18 and slats 11 wound about the roller 12, forms a spiral curve 50. The curvature of each slat edge is defined by the segment of the spiral curve 50 on which the respective slat is positioned when the blind is retracted. As such, the curvature in the set of slats 11 changes progressively between each adjacent slat 30, 32. That is, slats nearer to the top of the blind 10 have a mean, or average radius which is less than that for slats nearer to the bottom of the blind.

In order to achieve the described progressive curvature pattern, each of the slats 30, 32 is initially adhered to the screen 18 at respective slat rear edges 44, 48, during the manufacturing process. During this process, the screen 18 is wound about the roller 12 so that the blind 10 is in a retracted configuration. The blind 10 is then heat treated to permanently set the slats in a desired form.

The curved slats provide directional light shading not capable with ordinary roller shades. As indicated above, the open area for a typical fiberglass roll screens must be limited to three to five percent or else direct sun from above would be overly bright in the internal space. With the slatted roller blind 10, the function of controlling direct sun penetration from above is performed by the slats rather than the screen. The open area of the screen 18 in the slatted roller blind 10 can be forty to fifty percent.

Furthermore, the retracted configuration of the slatted roller blind is significantly more compact than the cited prior art slatted blinds. As illustrated with the prior art, slats having the same radius of the roller would flex away from the roller when the blind is retracted. On the other hand, slats having an edge radius greater than the roller would tangentially extend past the roller when the blind is retracted. Both undesirable prior art configurations, which provide a bulky and difficult to manipulate retracted blind, are avoided with the disclosed slatted roller blind.

Moreover, for at least two separate reasons, the curved slats 30, 32 provide the screen with a greater resistance from becoming skewed or shifting along the longitudinal axis of the roller while the blind is being retracted. Firstly, the properly curved slats 30, 32 of the disclosed material urge the screen 18 into the horizontally correct alignment. Secondly, the tight-rollup form, itself, separate from the urging function performed by the slat material, eliminates skew. Accordingly, matching the slat curvature to the roller diameter enables a tight roll-up packing and eliminates skew. This is distinct advantage to prior art roller shades.

The slatted roller blind, due to its compact retracted configuration, can be fabricated in relatively long units and rather easily subdivided with a hand or electric saw. For example, the blind can be fabricated in sixteen-foot lengths, which is about two and a half times the typical blind length. Statistically, such a length provides a reasonable yield when cutting for custom sized shades of the normal size range between three and eight feet wide.

Figure 4:
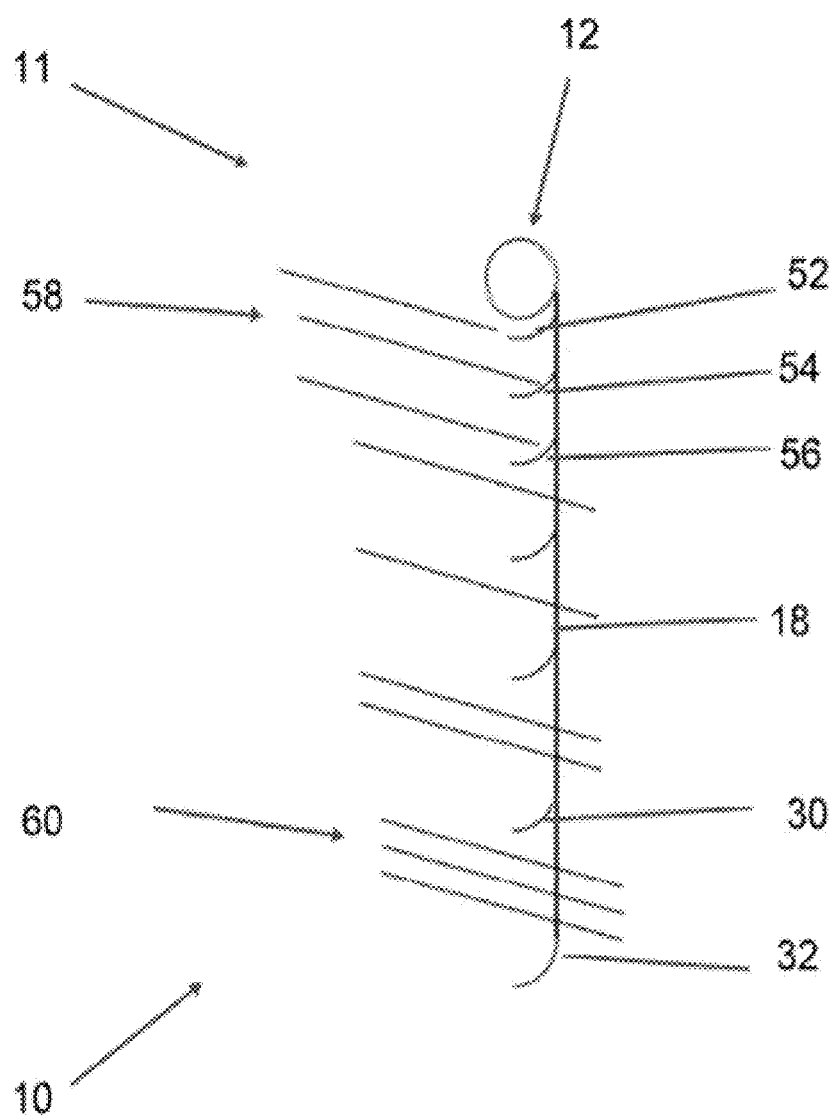
FIG. 4 illustrates an embodiment of the invention in which the slats are progressively spaced.

A progressive spacing can also be provided between slats, as illustrated in exaggerated form in FIG. 4. Here, the blind 10 is installed such that front edge of the slats projects towards the direct incident light.

As can be seen in FIG. 4, vertical spacing between adjacent slats, i.e., lengthwise along the screen, progressively increases, starting at the top slat and continuing to the bottom slat. For example, turning to the top three slats 52, 54, 56, the distance between the second and third slats 54, 56 is greater than the distance between the first and second slats 52, 54. The actual spacing gradient between each slats could increase by, for example, ten-thousandths to fifteen-thousandths of an inch.

In FIG. 4, direct incident light is illustrated in as sets of essentially parallel lines 58, 60. Due to the progressive spacing, direct light is blocked from passing through the top pair of slats 52, 54. On the other hand, some direct light is capable of passing through, for example, the bottom pair of slats (the aforementioned first and second slats) 30, 32.

The progressive spacing provides more view and less shade through the bottom slats 30, 32 as compared with the top slats 52, 54. As a result, sunlight is allowed to enter and brighten a space while being blocked from the eyes of persons standing in the space.

It is to be appreciated that the reversed spacing progression could be desired and implemented into the blind design. Such a reverse spacing could be appropriate for an office in which a person needs to sit for long periods at a computer. The person may wish to flood the top of the room with light while blocking ambient light from the bottom of the room.

Yet alternatively, a constant spacing between slats may be desired and implemented into the blind design. Other spacing options, such as a progression defined by non-linear gradient, such as a parabolic gradient, or a non-uniform gradient, would be within the scope of the invention.

Consideration will now be given to the materials used for the slatted roller blind 10. The roller 12 illustrated in FIG. 1 is fabricated from an aluminum tube having an outer diameter of approximately two inches and a wall thickness of approximately a sixteenth of an inch. However other tube materials and sizes could be utilized depending on the space available and required material characteristics. As a variation in size, a one inch outer diameter tube is a readily acceptable option.

Figure 5:
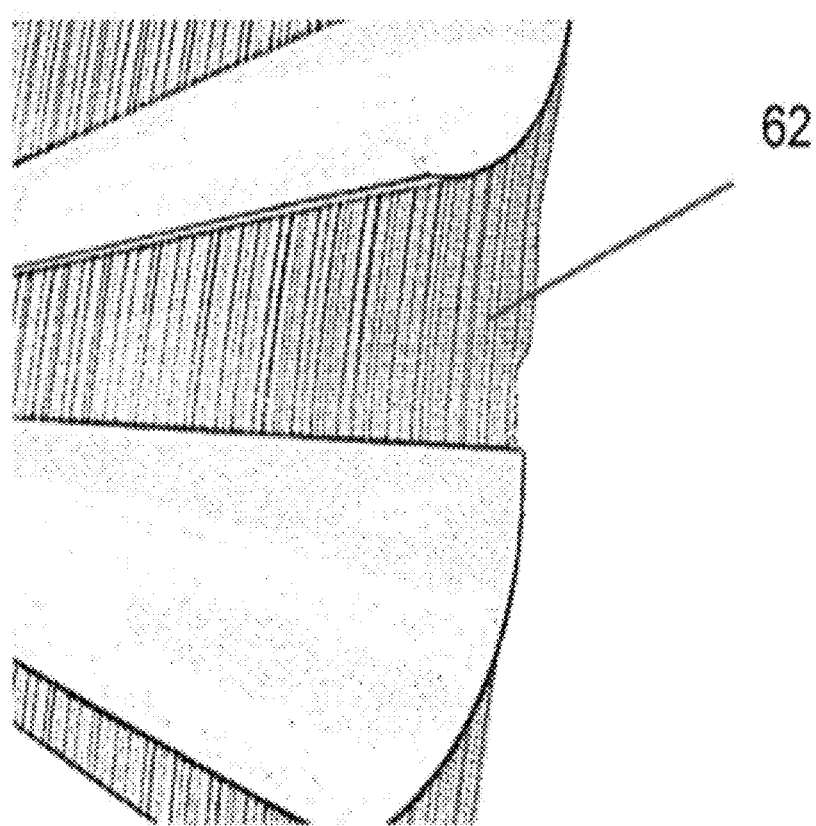
FIG. 5 represents a magnified view of the embodiment in FIG. 1, illustrating a fabric used for the screen.

The material used for the screen 18 depends on the use of the blind 10. An indoor blind 10, as illustrated in the figures, and particularly in FIG. 5, is manufactured from a woven or knit, semi-sheer or sheer fabric. Furthermore, the illustrated indoor fabric includes an aesthetic design print or pattern 62. The specifically illustrated pattern 62 provides the appearance of sets of lines which extend lengthwise along the screen and are grouped widthwise along the screen. However, other print or pattern designs are acceptable.

For external purposes, instead of a woven fabric, a rollable screen suitable for outdoor exposure is utilized. Such a screen would be more durable than an indoor screen. Materials may include, by way of illustration, but without limiting the possible selection, metal, such as aluminum, or plastic, vinyl, fiberglass, and the like. A typical window screen, for example, can be fabricated from an aluminum mesh. Such window screens are readily applicable as screens 18 for the slatted roller blind. The screen material may alternatively be core-and-sheath, such as vinyl-coated fiberglass yarns, or polyethylene coated polypropylene yarns, which are heat-fused after weaving to fix the yarns at their crossing points.

If the screen is in the form of a wire mesh material, the screen may be oriented at a forty-five degree angle or some other angle which offsets the mesh from a typical window or door screen orientation. Such contrast between the screen mesh in the slatted roller blind and a window or door screen avoids a visual moiré pattern.

The slats 30, 32 are manufactured from a non-woven blackout, i.e., opaque, fabric, such as a non-woven fabric laminated to an opacifying film. The slats could also be manufactured by thermoplastic, by itself, such as PVC, PET (polyester) or polycarbonate. One example of suitable fabric is seven to fifteen mils thick PVC, PET, or PC film, which is thermo-formable at between 170 and 250 degrees F. Another example is laminating one mil of white PET (opacifying film) to a non-woven, fifty to eighty grams-per-square-meter fabric, made of thermo-formable polyester fiber, which easily accepts glue and coloring as desired. The slats 30, 32 can be adhered to the screen 18 at the respective slat rear edges 44, 48 using a co-polyester adhesive hot-melt, applied under pressure.

Turning to other components of the slatted roller blind, the roller may be optionally installed in a headrail (not shown). The size of the headrail would be large enough to house the roller and retracted blind.

The blind is fitted with a weighted bottom rail for maintaining the screen in a taut condition. The weight of the bottom rail would be particularly useful for the blind disposed in an exterior side of the architectural opening. In this configuration, the weight of the bottom rail would maintain stability of the blind despite, e.g., the presence of wind in an exterior configuration. Typically, tracks or tension cables, which engage the bottom rail, provide additional resistance to wind.

The headrail and bottom rail may take on any of a number of shapes. Considerations for selecting a shape would be anticipated durability, cost, or aesthetic requirements of the overall blind assembly.

Alternatively, the blind assembly, whether in an interior or exterior installation, may be provided within a frame. When disposed in a frame, the bottom rail, for example, might be unnecessary.

Control of the roller, to extend or retract the blind, could be implemented by either a direct control mechanism or an indirect control mechanism. An example of a direct control mechanism is a lift cord with associated gears. An example of an indirect control mechanism is an electric motor operated by a wall switch or a wireless remote. The wireless remote could communicate with the electric motor using electronics typically adapted for radio frequency communications.

The use of a direct control mechanism will typically be in an indoor installation. The use of an indirect control mechanism will typically be in an exterior installation. However, neither configuration of the control mechanisms is limited to the exterior or interior installation. Various known options for direct or indirect operation of the roller are available. Accordingly, further discussion of these components is omitted.

Although several embodiments of the present invention have been disclosed above, the present invention should not to be taken to be limited thereto. In fact, it is to be understood that one of ordinary skill in the art will be able to devise numerous arrangements, which, although not specifically shown or described, will embody the principles of the present invention and will fall within its scope. Modifications to the above would be obvious to those of ordinary skill in the art, but would not bring the invention so modified beyond the scope of the appended claims.

I claim:
1. A roller blind comprising:
 a screen adapted for being rolled about a longitudinal axis into a retracted state, whereby said screen forms a spiral curve about the longitudinal axis; and
 a plurality of slats, each slat in said plurality of slats having a width and a length, each slat in said plurality of slats being oriented on said screen in a lengthwise direction along the longitudinal axis and spaced from adjacent slats in said plurality of slats in a direction transverse to the longitudinal axis;

wherein:
said plurality of slats includes more than two slats and each slat in said plurality of slats is connected at a respective rear slat edge to said screen; and
each slat in said plurality of slats is thermoformed from a thermoformable material to have a set curvature to match the spiral curve on which each slat in said plurality of slats extends when said blind is in the retracted state, so that the radius of curvature of each slat in said plurality of slats increases from said connected rear slat edge of each slat in said plurality of slats to a free bottom edge thereof.

2. The blind of claim 1, wherein said plurality of slats includes first and second slats, said first slat being disposed closer to a top edge of said screen than said second slat, said first slat having an effective radius that is less than an effective radius of said second slat.

3. The blind of claim 2, wherein an open area of said screen is greater than ten percent.

4. The blind of claim 3, wherein the open area of said screen is between forty and fifty percent.

5. The blind of claim 1, wherein spacing between adjacent slats in said plurality of slats progressively changes as said slats in said plurality of slats are positioned further from a top edge of said screen.

6. The blind of claim 5, wherein said progressive change is linear.

7. The blind of claim 1, wherein spacing between adjacent slats in said plurality of slats increases as said slats in said plurality of slats are positioned further from a top edge of said screen.

8. The blind of claim 1, wherein spacing between adjacent slats in said plurality of slats decreases as said slats in said plurality of slats are positioned further from a top edge of said screen.

9. The blind of claim 1, wherein spacing between adjacent slats in said plurality of slats is constant from a top edge of said screen to a bottom edge of said screen.

10. The blind of claim 1, wherein said screen is rolled about a roller, and a depth of each slat in said plurality of slats is proportional to a diameter of the roller.

11. The blind of claim 1, wherein a width of said screen and a length of each slat in said plurality of slats are equal.

12. The blind of claim 1, wherein said slats in said plurality of slats are connected to said screen via a hot-melt application.

13. The blind of claim 1, wherein said slats in said plurality of slats are opaque.

14. The blind of claim 1, wherein said slats in said plurality of slats are PVC, PET, or PC film.

15. The blind of claim 1, wherein said slats in said plurality of slats are thermo-formable at between 170 and 250 degrees F.

16. The blind of claim 1, wherein said screen is a woven or knit fabric.

17. The blind of claim 1, wherein said screen fabric is semi-sheer or sheer.

18. The blind of claim 1, wherein said screen is fabricated from aluminum, plastic, vinyl, fiberglass, or a core-and-sheath material.

19. The blind of claim 1, wherein said screen is a core-and-sheath material including a vinyl-coated fiberglass yarn or a polyethylene coated polypropylene yarn.

20. The blind of claim 1, wherein said screen forms a mesh pattern angularly offset from the longitudinal axis.

21. The blind of claim 20, wherein said mesh pattern is offset by forty five degrees from the longitudinal axis.

22. The blind of claim 1, further comprising a drive system coupled to a roller attached to said screen for moving said screen between an extended state and the retracted state.

23. The blind of claim 22, wherein said drive system includes an electric motor.

24. The blind of claim 23, further comprising a switch for remotely operating said drive system.

25. The blind of claim 24, wherein said switch is wirelessly connected to said drive system.

26. The blind of claim 22, wherein said drive system is a pull cord and gear assembly.

27. A blind assembly including said blind of claim 22, and further comprising a roller and a headrail which is large enough to conceal said blind and said roller in the retracted state and conceal said drive system.

28. The blind of claim 1, further comprising a weighted bottom rail.

29. A blind assembly comprising said blind of claim 1, and further comprising a frame for housing said blind.

30. The blind of claim 1, wherein the spacing between adjacent slats in said plurality of slats is greater than the width of each of said adjacent slats.

31. The blind of claim 1, wherein the spacing between adjacent slats in said plurality of slats is less than the width of each of said adjacent slats.

32. The blind of claim 1, wherein the spacing between adjacent slats in said plurality of slats is equal to the width of each of said adjacent slats.

33. The blind of claim 1, wherein each slat in said plurality of slats has substantially the same circumferential dimension.

34. The blind of claim 5, wherein said progressive change is nonlinear.

35. A roller blind comprising:
a screen adapted for being rolled about a longitudinal axis into a retracted state, whereby said screen forms a spiral curve about the longitudinal axis; and
a plurality of slats, each slat in said plurality of slats having a width and a length, each slat in said plurality of slats being oriented on said screen in a lengthwise direction along the longitudinal axis and spaced from adjacent slats in said plurality of slats in a direction transverse to the longitudinal axis;
wherein:
said plurality of slats includes more than two slats and each slat in said plurality of slats is connected at a respective rear slat edge to said screen; and
each slat in said plurality of slats is formed to have a permanently set curvature defined by and matching a segment of the spiral curve on which said plurality of slats extends when said blind is in the retracted state, so that the radius of curvature of each slat in said plurality of slats increases from said connected rear slat edge of each slat in said plurality of slats to a free bottom edge thereof.

36. The blind of claim 35, wherein said plurality of slats includes first and second slats, said first slat being disposed closer to a top edge of said screen than said second slat, said first slat having an effective radius that is less than an effective radius of said second slat.

37. The blind of claim 35, wherein a depth of said slats in said plurality of slats is proportional to a diameter of a roller that is attached to said screen.

* * * * *